F. E. Allen,

Jewellers' Tool.

No. 112,203.  Patented Feb. 28, 1871.

Witnesses
John A. Ellis
J. V. White

Inventor
F. E. Allen,
Per,
J. H. Alexander
Atty.

United States Patent Office.

FRANCIS E. ALLEN, OF KEENE, NEW HAMPSHIRE.

Letters Patent No. 112,203, dated February 28, 1871.

IMPROVEMENT IN JEWELERS' COMBINED CALIPERS AND POISING-TOOLS.

The Schedule referred to in these Letters Patent and making part of the same.

*To all whom it may concern:*

Be it known that I, FRANCIS E. ALLEN, of Keene, in the county of Cheshire and State of New Hampshire, have invented certain new and useful Improvements in Jewelers' Combined Calipers and Poising-Tool; and I do hereby declare that the following is a full, clear, and exact description thereof, reference being had to the accompanying drawing and to the letters of reference marked thereon, which form a part of this specification, in which—

Figure 1:
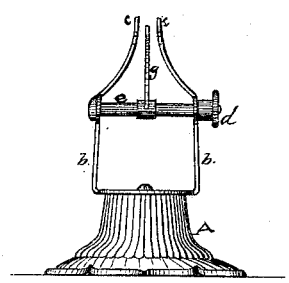
Figure 1 is an end view of my invention.
Figure 2:
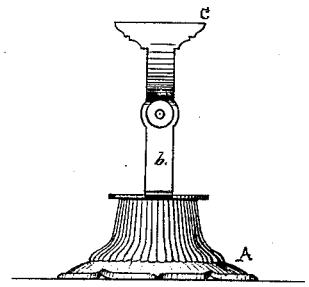
Figure 2 is a side view.
Figure 3:
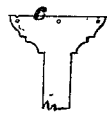
Figure 3 is an inside view of one of the jaws of the calipers.

The nature of my invention consists in constructing a combined calipers and poising-tool, in the manner hereinafter fully set forth.

In the annexed drawing—

A represents the base of the tool.

To the circular top of base A the calipers $b$ are securely fastened, the said calipers being made to terminate in the parallel jaws $c\ c$.

On the inner side and on top of each jaw there are indentations so arranged as to be exactly opposite when the jaws $c\ c$ are in position.

$e$ designates a spindle or arbor passing horizontally through the calipers, and having a screw-thread on one end, upon which the nut $d$ is adjusted.

$g$ represents a curved arm, made of a thin plate of metal, and having a socket at its lower end through which the spindle $e$ passes. The arm $g$ fits tightly on the spindle and moves with it.

In ascertaining whether a wheel is perfectly true on its arbor, or whether the arbor itself is true, place the pivots at the ends of said arbor in or on the two corresponding depressions in the jaws of the calipers, and then turn the curved arm $g$ up to the side of the wheel. By turning the wheel around, you will be enabled to ascertain whether the wheel or arbor is true.

Having thus fully described my invention,

What I claim, and desire to secure by Letters Patent, is—

The jaws $c\ c$, provided with indentations, and combined with spindle $e$ and arm $g$, substantially as and for the purpose set forth.

In testimony that I claim the foregoing as my own I affix my signature in presence of two witnesses.

FRANCIS E. ALLEN.

Witnesses:
L. E. THURSTON,
J. S. HOLT.